United States Patent [19]

Hayes

[11] Patent Number: 4,975,938
[45] Date of Patent: Dec. 4, 1990

[54] COMMUNICATIONS LINK TESTING

[75] Inventor: Mark Hayes, Canterbury, England

[73] Assignee: British Telecommunications Public Limited Company, United Kingdom

[21] Appl. No.: 482,937

[22] Filed: Feb. 22, 1990

[30] Foreign Application Priority Data

Feb. 24, 1989 [GB] United Kingdom ............... 8904282

[51] Int. Cl.$^5$ ............................................. H04M 3/26
[52] U.S. Cl. ....................................... 379/11; 379/25; 379/246
[58] Field of Search ....................... 379/23, 16, 25, 10, 379/11, 245, 246, 248

[56] References Cited

U.S. PATENT DOCUMENTS 4,594,480  6/1986  Betton ................................. 379/10
4,774,721  9/1988  Gift et al. ......................... 379/25 X Primary Examiner—Stafford D. Schreyer
Attorney, Agent, or Firm—Nixon & Vanderhye

[57] ABSTRACT

Apparatus for testing communications links comprises a microprocessor 20 which causes each telephone number in a range of telephone numbers to be dialed through an exchange test input port (TA1-TA4) by dialers 31-34. Adaptors 41-4N are arranged for clamping to terminal blocks of (e.g.) an exchange main distribution frame. Once the exchange has set up a call scan driver 23 causes each output port of the MDF connected to the adaptors to be pulsed in turn. Detectors 31'-34' monitor the input ports TA1-TA4 for pulse presence to cause interrupt of the microprocessor 20. The microprocessor reads a count from the scan driver 23 which is forwarded to a computer 1 which correlates the telephone number dialed with a physical location (equipment number) of the output port.

8 Claims, 3 Drawing Sheets

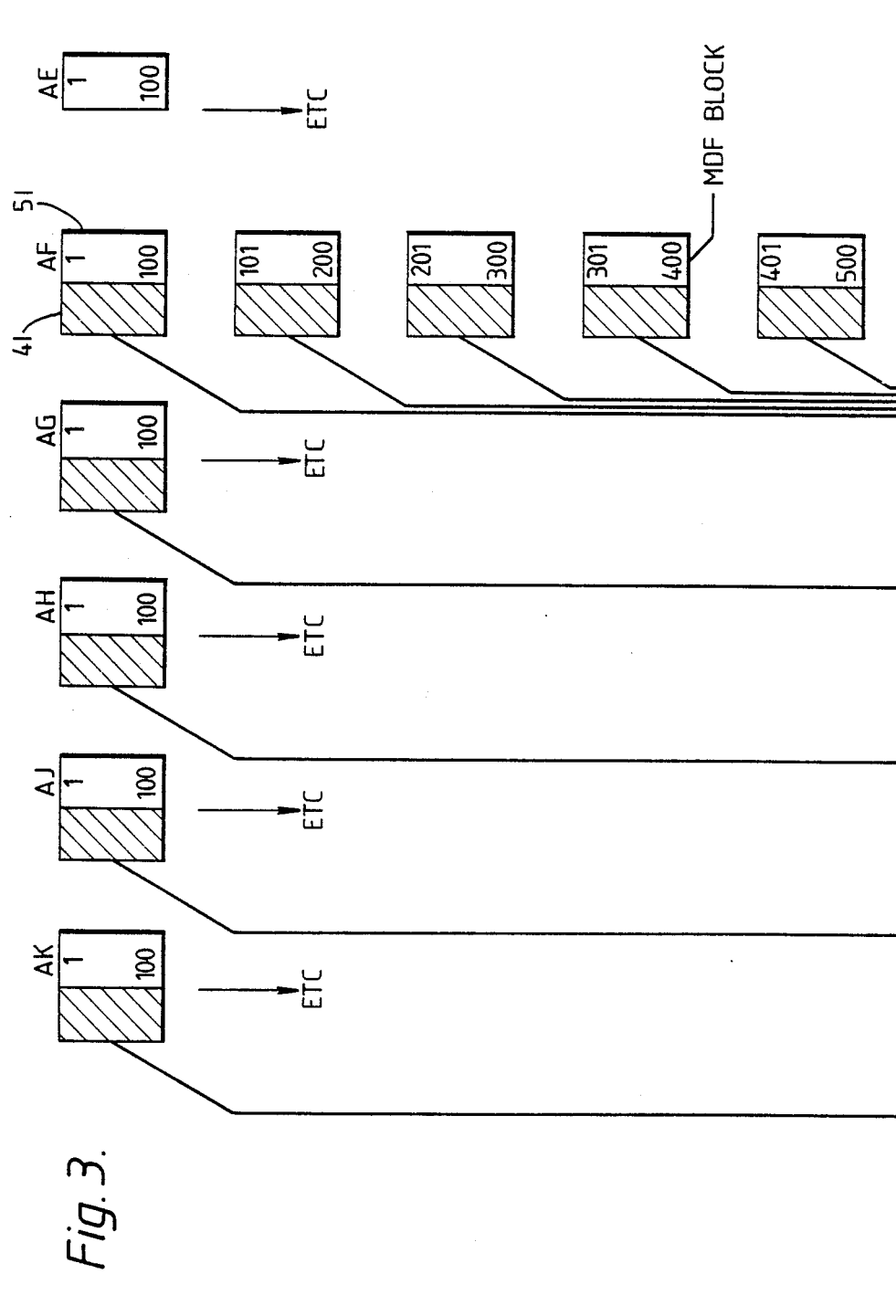

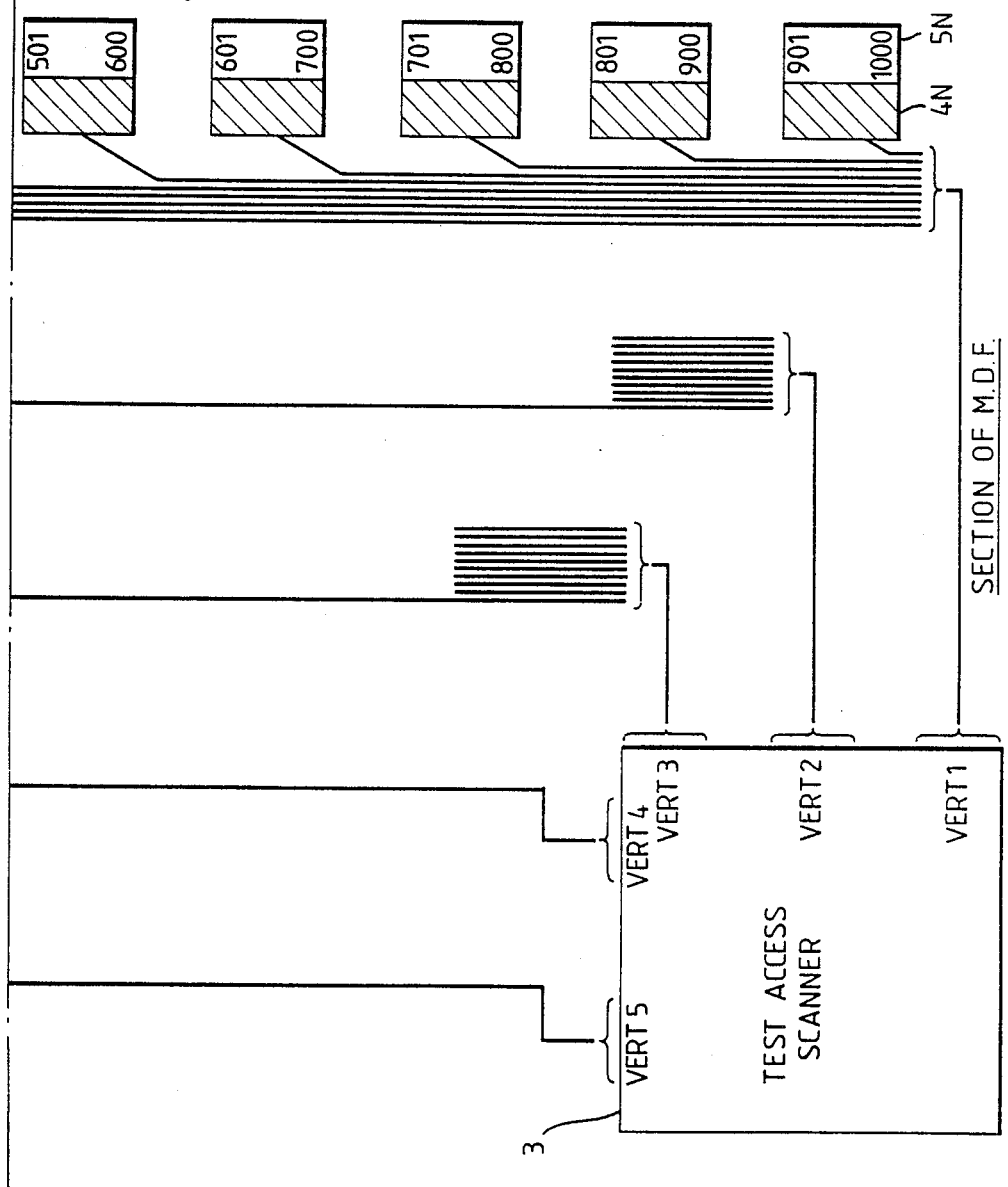

COMMUNICATIONS LINK TESTING

The present invention relates to communications link testing and more particularly to communications link testing apparatus for determining wiring relationships between customers' telephone numbers and particular exchange apparatus in a telecommunications exchange.

In telephone exchanges, particularly in very large installations, maintaining records of customer telephone line connections to distribution frames and other apparatus is a time consuming activity. Over a number of years, sometimes due to urgent changes having been made to maintain customer service and sometimes due to erroneous entries being made on customer record files, determining correlation between a telphone number and an equipment appearance may prove difficult.

In order to check such records past practice has included manual checks, in some cases carrying out manual tracing of wiring through telephone exchanges.

It is particularly important that maintenance and commissioning personnel can accurately identify customer line appearances when new exchange equipment is being brought into service or when faults arise affecting a particular customer.

Therefore it is one object of the present invention to provide communications link testing apparatus capaable of rapid and accurate correlations between customers' telephone numbers and respective lines connections.

According to one aspect of the present invention there is provided communicatons link testing apparatus comprising connector means for connection to a call originating port of a telecommunications exchange, adaptor means for connection to a multiplicity of potential output connection ports of such a telecommunications exchange and means to cause a telephone number to be signalled by way of the originating port, characterised by scanning means (23) arranged to cause a pulse to be transmitted to each potential connection port in turn and to effect a count of the number of pulses so transmitted, by detector means (31'-34') arranged to cause the count to be read at the time of detection of a pulse, and by calculating means (1) arranged to convert the count to parameters identifiying a location whereby correlation between a selected telephone number and an appearance on a specific output connection port is achieved.

Preferably the calculating means comprises a computer programmable with a range of telephone numbers and a range of potential output connection ports, the computer causing the microprocessor to effect testing of each number in the range of telephone numbers in turn.

Preferably each adaptor means includes counter means arranged to cause output of a pulse to each output port in turn, the scanning means causing the respective counter means in each of the adpator means to be started in turn.

According to a second aspect of the present invention there is provided a method of testing communicatons links comprising the steps of transmitting data defining a telephone number to a telephone exchange by way of an input port thereof, sequentially transmitting an electrical signal to each of a multiplicity of potential output ports, monitoring the input port for presence of the electrical signal and determining from the itme of arrival of the signal the identity of the output port to which the telephone number is connected.

Communications link testing apparatus and a method of testing communications links each in accordance with the invention will now be described by way of example only with reference to the accompanying drawings of which:

FIG. 3 is a block schematic diagram showing interconnection between distribution frame terminal blocks and the test access unit of FIG. 2.

Figure 1:
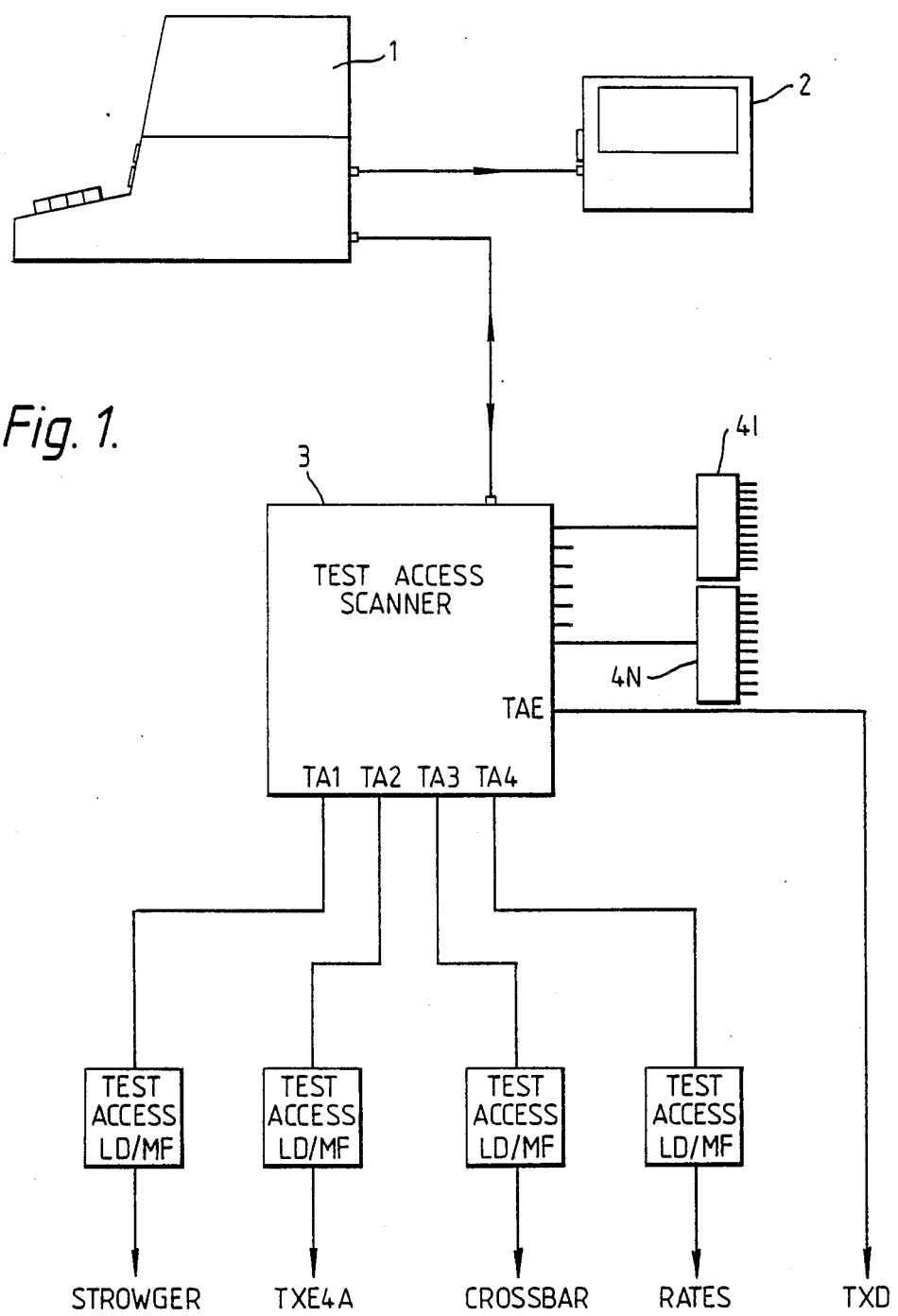
FIG. 1 is a block schematic diagram of the apparatus.

Referring first to FIG. 1, the apparatus comprises a host computer 1 such as an IBM (trademark) PC or compatible type connected to a printer 2 and driving a test access control circuit or scanner 3. The test access control circuit 3 has a series of bidirectional ports TA1-TAE each having a plug in type connector for connection to a respective test access socket of a telephone exchange (not shown).

The test access scanner 3 also has connections to a number of adaptor shoes 41-4N only two of which are shown. The adaptor shoes 41-4N comprise an array of spring loaded contacts compatibly located to contact pins of terminal blocks on an exchange main distribution frame (MDF), the adaptor being arranged for detachable clamping to such blocks.

Figure 2:
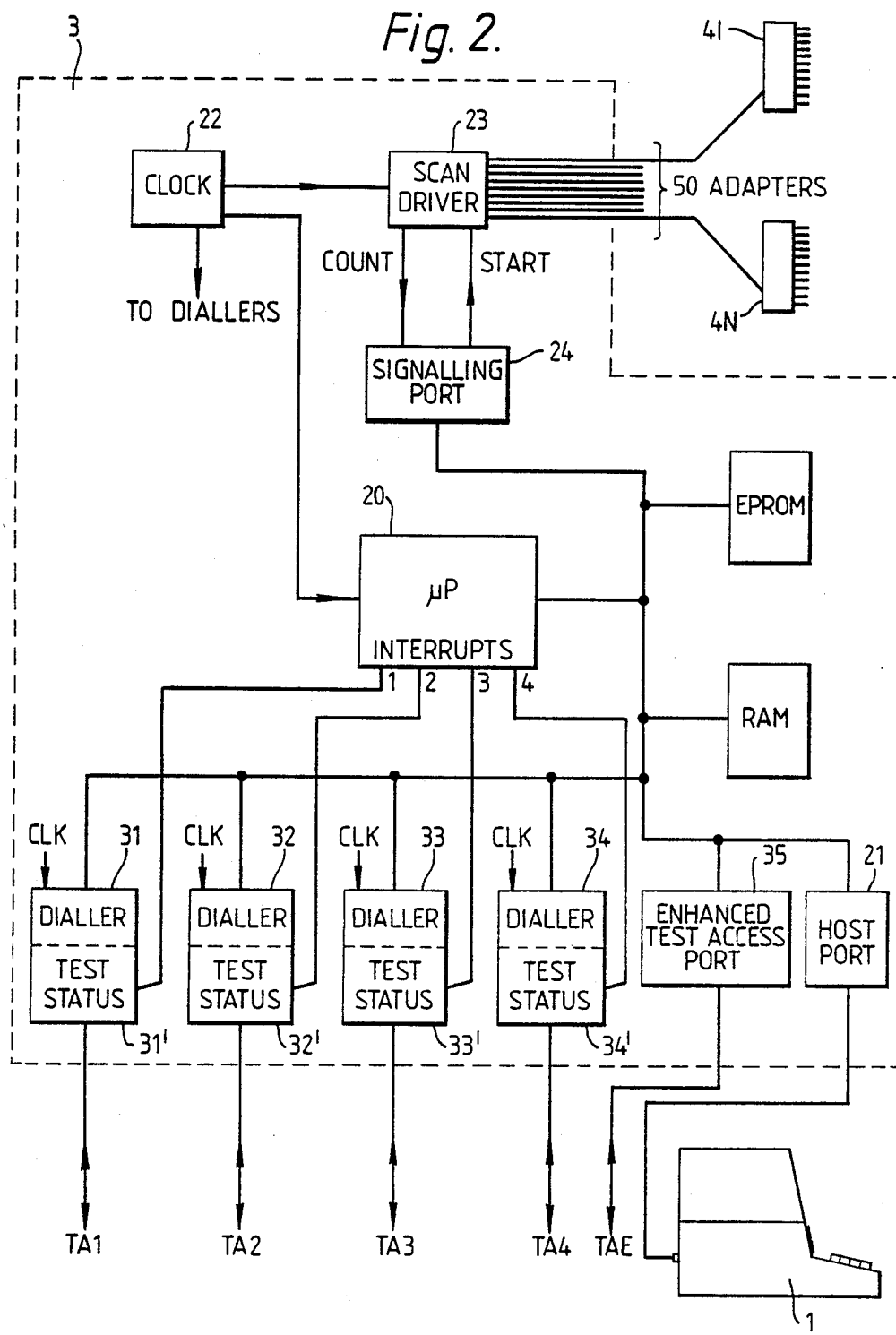
FIG. 2 is a block schematic diagram of a test access unit of FIG. 1 showing further detail.

Turning now to FIG. 2 the test access scanner 3 comprises a microprocessor 20 which is connected to the computer 1 by way of a bidirectional port 21. The port 21 thus allows the microprocessor 20 to recieve data from the computer 1 (for example a telephone number to be accessed) and to transmit data to the computer identifying a pair connection associated with the telephone number.

A clock control circuit 22 is also provided, the clock control circuit providing pulses at a first fixed frequency to control dialling of telephone numbers by diallers 31-34 associated with each of the ports TA1--TA4 and at a second frequency to control a scan driver 23 associated with the adaptors 41-4N.

Each of the test access ports TA1-TA4 may be associated with a particular exchange unit in a building for example one of the ports may be connected to a strowger switching unit, another to a crossbar switching unit and another to a reed-electronic type unit suchy as an exchange of the kind known in the United Kingdom as a TXE4A. Any exchange test access capable of responding to a loop disconnect pulse signal or multifrequency signalling of digits of a telephone number may be connected to any of the port TA1-TA4.

An enhanced test access driver 35 is provided on the port TAE to enable more rapid signalling of selected telephone numbers by direct data transfer to enhanced digital switching units such as that known in the United Kingdom as a "System X" exchange which has a sophisticated processor control system.

In use, the host computer 1 is initialised by an operator who enters data defining a directory number range to be tested, data defining the numbering scheme range of the pairs to be tested (eg. and alpha-numberic range defining block positions on an MDF), data defining the number of line pairs which appear on each of the blocks and parameters of the test access links such as the exchange unit to which the directory numbers are related.

Referring also to FIG. 3, the adaptors 41-4N are clamped to respective terminal blocks 51-5N of the MDF in the present case, ten blocks 51-5N being shown on each of five "verticals" permitting testing in respect of 5000 line pairs.

Once the computer 1 is initialised it causes data defining the first telephone number to be tested to be forwarded to the microprocessor 20. The microprocessor 20 determines which of the test access ports (TA1--TAE) is appropriate for the selected telephone number and then causes the associated dialler 31-34 (if any) to signal the number to the exchange. The exchange handles call set up in the usual manner for test calls. Having caused the call to be set up, the microporcessor 20 forwards a start signal through a bidirectional signalling port 24 which causes the scan driver 23 to commence sequential scanning of the 500 line pairs to which it is connected.

Under control of a ten microsecond pulse from the clock 22, the scan driver 23 commences scanning from input 1 of adaptor 41 to input 100 of adaptor 41 and then through each of the adaptors in turn causing a ten microsecond pulse to be transmitted to the respective line pair connected. This process continues until a pulse detector in a test status circuit 31'-34' associated with the auto diallers causes an interrupt signal to appear on an input port of the microprocessor 20. On receipt of an interrupt signal the mocroprocessor 20 reads the count (from 1 to 5000) reached by the scan driver 23 which count indicates the location of the line pair appearance on the MDF. If no interrupt signal appears in the scanning of all 5000 copies, a "no appearance" message is returned to the microprocessor 20 and thence to the computer 1.

The count is forwarded by the microprocessor 20 to the computer 1 wherein it is converted to a vertical reference (AF-AK in the example of FIG. 3) and a bar pair number (1-1000). The telephone number to bar pair allocation may be printed out on the printer 2 or may be compared with a previously entered data file in which case only anomalous detections are printed out.

The computer 1 now causes a further telephone number to be forwarded until all telephone numbers in the selected range have been tested.

In a preferred arrangement, there are fifty adaptors (41-4N) each of which includes a scanning pulse generator, the scan driver 23 being arranged to cause the repective scanning pulse generator to commence scanning in turn. The scanning pulse generator will "free run" from 0 to 100, transmiting a pulse to each connection in turn and will then revert to "0" pending a further start signal. Thus if each adaptor is arranged for connection to a 100 pair connector block, the scan driver 23 will start each in turn at 100×10 microsecond (1 millisecond) intervals. Interface adaptors (41-4N) may be provided for other than 100 pair connector blocks and to effect connection to differing types of block.

The apparatus hereinbefore described may be permanently provided in an exchange building to permit regular testing, thus facilitating early identification of exchange faults. Alternatively, transportable equipment may be used for occasional testing at different locations.

While as hereinbefore described reference has been made to ten microsecond pulses being applied through the adaptors 41-4N it will be appreciated that other pulse lengths may be used.

For the avoidance of doubt it is here noted that an alternative pulsing strategy may be used. In one preferred scanning arrangment, the scanning commences with the first connection of the first adaptor 41 and continues with each such first connection of the other adaptors until the first connection of the last adaptor 4N has been pulsed. The second connection of each adaptor 41-4N is then pulsed in sequence and then each subsequent connection in turn. This scanning method has been found to simplify the circuiting of the scan driver 23.

I claim:

1. Communications link testing apparatus comprising connector means for connection to a call originating port of a telecommuncations exchange, adaptor means for connection to a multiplicity of potential output connection ports of such a telecommunicatons exchange and means to cause a telephone number to be signalled by way of the originating port, scanning means arranged to cause a pulse to be transmitted to each potential connection port in turn and to effect a count of the number of pulses so transmitted, detector means coupled to the connector means and arranged to cause the count to be read at the time of detection of a pulse, and calculating means arranged to convert the count to parameters identifying a location whereby correlation between a selected telephone number and an appearance on a specific output connection port is achieved.

2. Communicatons link testing apparatus as claimed in claim 1 wherein a microprocessor is provided intermediate the calculating means and the scanning means, signalling means are coupled to the connector means and the microprocessor is arranged to cause the signalling means to transmit signals to the originating port and arranged to receive an interrupt signal from the detector means on detection of a pulse.

3. Communication link testing apparatus as claimed in claim 2 wherein the calculating means comprises a computer, the computer being programmable with data defining a range of telephone numbers and a range of potential output connection ports, and being arranged to cause the microprocessor to effect testing of each number in the range of telephone numbers in turn.

4. Communications link testing apparatus as claimed in claim 3 wherein the computer is programmable with data defining predetermined interconnections between telephone numbers and output connections ports, the computer being arranged to compare the specific output connection port determined by the count with the predetermined output connection port and to record differences (if any) between them.

5. Communications link testing apparatus as claimed in any one of claims 1 to 3 wherein each adaptor means includes counting means arranged to cause a pulse to be transmitted to each port associated therewith in turn, the scanning means causing the respective counting means of each adaptor means to be started in turn.

6. A method of testing communicatons links comprising the steps of transmitting data defining a telephone number to a telephone exchange by way of an input port thereof, sequentially transmitting an electrical signal to each of a multiplicity of potential output ports, monitoring the input port for presence of the electrical signal and determining from the time of arrival of the signal the identity of the output port to which the telephone number is connected.

7. A method of testing communications links as claimed in claim 6 further comprising comparing the identity of the output port with data defining an expected output port and outputting information identifying differences (if any) between them.

8. A method of testing communications links as claimed in either claim 6 or claim 7 wherein the determining step comprises counting the number of the output ports to which the electrical signal has been transmitted and reading the count value upon detection of the signal at the input port.

* * * * *